United States Patent Office 2,911,325
Patented Nov. 3, 1959

2,911,325

FLAME RESISTANT ORGANIC TEXTILES AND METHOD OF PRODUCTION

George L. Drake, Jr., Wilson A. Reeves, and Leon H. Chance, New Orleans, La., assignors to the United States of America as represented by the Secretary of Agriculture No Drawing. Original application June 5, 1956, Serial No. 589,562. Divided and this application April 24, 1957, Serial No. 661,557

8 Claims. (Cl. 117—136)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to flame resistant organic textile fabrics and to their production by treating the fabrics with the novel polymers disclosed and claimed in Ser. No. 589,562, filed June 5, 1956, now Patent No. 2,886,539, of which the present application is a division.

In general, this invention relates to the production of flame proof textiles by the use of polymers capable of being produced by the reaction of a 1-aziridinyl phosphine oxide or sulfide (e.g., a compound that contains at least one 1-aziridinyl group,

attached to pentavalent phosphorus), with a methylol phosphorus compound of the formula

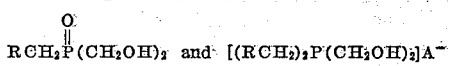

wherein A represents a monovalent anion and R represents OH or a radical produced by the reaction of the OH of a PCH$_2$OH group with a nitrogen compound containing at least one trivalent nitrogen atom and at least one member selected from the group consisting of H and CH$_2$OH attached to trivalent nitrogen atoms.

Methods for producing reaction products of the methylol phosphorus compounds with the trivalent nitrogen compounds are disclosed in Patent Numbers 2,772,-188; 2,809,941, and 2,812,311.

Other aziridinyl compounds that undergo reactions described herein consist of compounds or polymers containing the following structures:

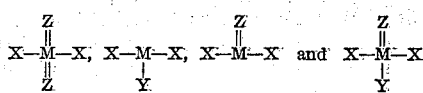

where Z is oxygen, sulfur or nitrogen;

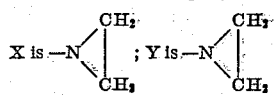

a dialkyl amine, an alkyl, an alkylene or an aryl group; M is boron, phosphorus, sulfur, arsenic, carbon, silicon, antimony or titanium. Some typical examples of compounds and polymers are:

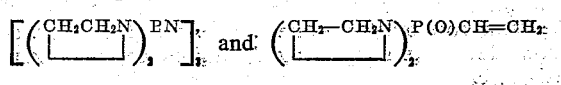

We have discovered that compounds that contain at least one 1-aziridinyl group attached to pentavalent phosphorus atoms react with methylol phosphorus compounds (e.g. compounds that contain at least two HOCH$_2$P groups) to produce polymers. Such polymers contain the reoccurring connecting structures,

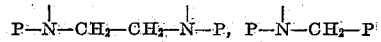

and

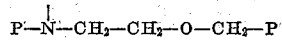

wherein the phosphorus atoms are pentavalent.

Such polymers can be produced in the form of solid synthetic resins. They can be deposited on the surfaces and/or in the interstices of hydrophilic fibrous organic materials, i.e., organic materials which absorb or adsorb water. When such resins are deposited, they reduce the combustibility of hydrophilic fibrous organic materials and resist removal by laundering and the like chemical treatments. Such resins can be deposited on the surfaces of non-hydrophilic materials to form flame resistant coatings.

1-aziridinyl phosphine oxides or sulfides suitable for use in this invention are compounds which contain at least one 1-aziridinyl group, (CH$_2$)$_2$N—, attached to pentavalent phosphorus atoms. The compounds used in this invention may be represented by the following structure:

wherein

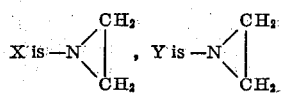

or a dialkyl amine group such as

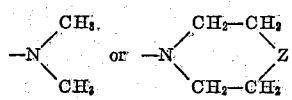

and where Z is oxygen or sulfur. The aziridinyl compounds can be prepared by substantially any of the known processes for producing such compounds. In general, they are prepared by reacting ethylenimine with the corresponding phosphorus halide. The preparation of tris(1-aziridinyl)phosphine oxide, [(CH$_2$)$_2$N]$_3$PO, has been described by Bestian and coworkers [Bestian et al., Ann. 566, 210-244 (1950)].

Suitable methylol phosphorus compounds include tris-hydroxymethyl)phosphine oxide; a phosphonium salt of the formula [(HOCH$_2$)$_4$P]$^+$A$^-$ in which A represents a monovalent anion; and the products of reacting either the phosphine oxide or the phosphonium salt with a "Methylol Reacting" compound (i.e. a compound capable of reacting with a PCH$_2$OH group) to produce a derivative that retains at least two PCH$_2$OH groups. The phosphonium chloride, tetrakis(hydroxymethyl)phosphonium chloride, of the formula (HOCH$_2$)$_4$PCl, is a readily obtainable phosphonium salt, and is the preferred salt for employment in the present process. However, by the usual procedures for replacing the anion of such an onium salt, the phosphonium chloride can readily be converted to, and employed in the form of, for example, the phosphonium acetate $(HOCH_2)_4POAc$; the phosphonium dihydrogen phosphate

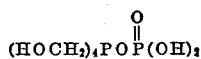

or the like phosphonium salt. The methylol phosphorus group containing derivatives of the phosphine oxide or the phosphonium salt can be a substantially monomeric product of reacting the phosphorus compound with at least one methylol reacting compound which is monofunctional in its capacity to react with $PCH_2OH$ groups, so that from about 1 to 2 moles of the methylol reacting compound combines with each mole of the phosphorus compound. Illustrative examples include the products of so reacting the tris(hydroxymethyl)phosphine oxide and/or the phosphonium salt with at least one: secondary amines such as diethylamine, N-vinyl cyclohexylamine, or the like; N-substituted amides such as N-methyl acrylamide, N-N'-trimethyl pinic acid diamide, N-propyl benzamide and the like; acids such as stearic acid, pinonic acid, monobutyl phthalate, and the like; and the like monofunctional reactants. The methylol phosphorus containing derivative can be a further polymerizable "methylol phosphorus" polymer such as water soluble polymers formed by reacting tetrakis(hydroxymethyl) phosphonium chloride with melamine or with methylated methylolmelamine such as those described in copending patent application Serial No. 421,213, filed April 5, 1954, now Patent No. 2,812,311.

Polymers provided by this invention can be produced in acidic, neutral, and alkaline conditions. They can be produced in the form of liquids or solids and can be molded by the conventional techniques of molding thermosetting resins. These polymers are valuable materials for use in production of: molded synthetic articles, such as buttons, electrical insulators and the like; synthetic coatings such as protective coatings, and paints and the like having reduced flammability; paper treating resins; textile resins; and the like.

The polymers provided by this invention are preferably prepared by gently heating a solution of the aziridinyl phosphine oxide or sulfide and the methylol phosphonium or methylol phosphine oxide until polymerization occurs. The preferred relative amounts of aziridinyl compound and methylol phosphonium or phosphine oxide used to polymerize can be calculated by conventional methods by assuming that: (1) for each aziridinyl group present in the compound, the functionality is two (e.g. if two aziridinyl groups are present, the functionality is four), (2) that the functionality of the methylol phosphorus compound is equal to the number of methylol groups present in the compound, (3) that tetrakis(hydroxymethyl)phosphonium chloride is converted to tris(hydroxymethyl)phosphine oxide in the presence of neutral carbonates like calcium carbonate, alkali carbonates like sodium carbonate, alkali metal hydroxides, tertiary amines, and bases in general. Thus it is apparent that in the preferred relative proportions, the aziridinyl compound and the methylol phosphorus compound will be present in such amounts that one aziridinyl group is provided for two methylol groups.

The polymers of this invention can be modified by incorporating an alkyl amine or an aliphatic alcohol into the solution containing the aziridinyl compound and the methylol phosphorus compound. For example if cetyl alcohol is used the polymers are especially suited for use in the production of soft, flame-resistant textiles.

The combustibility of organic fibrous materials can be reduced in accordance with this invention by: impregnating the fibrous materials with an aqueous solution, or uniform suspension or dispersion, of the monomeric compounds, or the partially polymerized monomers formed by reacting the monomeric compounds until partial polymerization occurs; and curing the impregnated materials at the temperatures conventionally used for curing fibrous organic materials.

When tetrakis(hydroxymethyl)phosphonium chloride is the methylol phosphorus compound used, it is preferable to dissolve it in water first, then add sufficient basic reacting compound to raise the pH of the aqueous solution to about 5 to 7 before adding the aziridinyl compound.

The pH of the solution containing the methylol phosphorus compound and the aziridinyl compound greatly influences the nature of the resulting polymer. The pH of these solutions can be adjusted with substantially any acid or base reacting material. Suitable acids include hydrochloric and acetic. Suitable bases include sodium hydroxide, sodium bicarbonate, sodium carbonate, triethanolamine and ethanolamine. If the pH of the solution is less than about 5.5, polymerization often proceeds so rapidly when heated that sufficient heat is produced from the exothermic reaction to cause the product to decompose with evolution of white fumes. The preferred pH of the solution is from about 6 to 8. A much higher pH can be used.

Surface active agents, water repellents, and other textile treating agents may be incorporated into the aqueous or emulsion treating media to modify the treated textiles. Surface active softening agents improve tear strength of cotton and rayon fabrics.

The process of this invention can suitably be used to reduce the combustibility of substantially any hydrophilic fibrous material such as cotton, rayon such as viscose rayon, ramie, jute, wool, paper, cardboard and the like materials which can be impregnated with a liquid and dried or cured.

Where a textile is being impregnated, it is of advantage to remove excess impregnating liquor by passing the textile through squeeze rolls prior to drying or curing the impregnated textile. It is also advantageous to dry the textile at about 70° to 110° C. before it is cured at a temperature of from about 100° to 170° C.

The degree of flame resistance imparted to a textile by these phosphorus and nitrogen containing resins can be varied from a low degree to a very high degree by varying the amount of polymer put in the textile.

Some advantages of flameproofing textiles in accordance with this invention are: textiles treated by this process are flame resistant, glow resistant, shrink resistant, and rot and mildew resistant; the effects of the treatment are permanent, and resistant to laundering, dry cleaning, and boiling alkali solutions; cellulosic textile materials retain a very high percentage of their tear and tensile strength; the treated cellulosic materials are resistant to the influences of hypochlorite bleaching as determined by tensile strength; treated textiles are made highly flame resistant with relatively small amounts of these phosphorus and nitrogen containing polymers.

In the examples provided below the following test methods were used to demonstrate flame resistance of fabrics provided by this invention:

(1) The vertical flame test as described in U.S. Federal Service, Federal Specification CCC-T-191b (1951). In this test, a strip of cloth is exposed to the luminous flame of a Bunsen burner and flameproofness is judged by the length of a tear produced through the charred area by a standard weight. The results of this test are expressed in char length in inches.

(2) The strip flame test as described in Textile Research Journal, volume 23, page 529 (1953). In this test, the degree of flame resistance is measured by determining the angle at which a narrow strip of cloth will not continue to burn when held in the vertical position and ignited at the bottom and then slowly rotating the cloth until the flame goes out. The greater the angle at which the flame goes out the greater the degree of flame resistance. 180 degrees represents the highest degree of flame resistance.

EXAMPLE 1

An aqueous solution was made by dissolving 5 parts (by weight) of tris(1-aziridinyl)phosphine sulfide, and 5 parts (by weight) of tetrakis(hydroxymethyl)phosphonium chloride in 40 parts of water. The solution was then divided into four equal parts (A, B, C, and D) and treated as described below. "A" was allowed to remain at pH 5.1. The pH of B, C and D was adjusted with triethanolamine to 6.1, 7.1 and 7.9 respectively. Some of each solution, A, B, C, and D was placed in a watch glass and then placed upon a steam bath for 15 minutes. At this time sample D was a hard clear mass, C was a tough mass and samples A and B were very viscous liquids. After an additional 15 minutes on the steam bath samples B, C and D were hard polymers whereas A was a very tough mass.

Samples A, B, C, and D (previously heated for 30 minutes on steam bath) were placed in oven at 140° C. for 5 minutes. Polymer A was light brown and water soluble. B was yellowish brown and was insoluble in water and acetone. Polymers C and D were also insoluble in water and in acetone and were light yellow in color. All samples were highly flame resistant and contained phosphorus, sulfur and nitrogen.

EXAMPLE 2

An aqueous solution was made containing 2.5 parts of tris(1-aziridinyl)phosphine sulfide, 2.5 parts of tris(hydroxymethyl)phosphine oxide and 20 parts of water. The pH of the solution was 5.1. It was divided into two equal parts, A and B and then part B was adjusted to a pH of 9.0 with triethanolamine. A part of each sample was placed upon a watch glass and heated on steam cone for 90 minutes. Viscous colorless polymers formed in both cases. They were then heated for 5 minutes at 140° C. Light yellow tough polymers formed that were insoluble in water and in ethanol.

When some of solutions A and B were placed directly in an oven at 140° C., without prior heating on the steam bath, sample A decomposed with the formation of dense white fumes.

EXAMPLE 3

An aqueous solution was made containing 6 parts of tris(1-aziridinyl)phosphine oxide, 4.8 parts of tris(hydroxymethyl)phosphine oxide and 43 parts of water and then sufficient sodium carbonate was added to raise the pH to 8.2. Most of the water was evaporated under reduced pressure and then the viscous liquid was heated on steam bath for 100 minutes. The product became insoluble in boiling water. The resulting material was heated for 30 minutes at 110° C. in oven to produce a hard, clear polymer. It was pulverized and washed with water and then with acetone. The washed polymer contained phosphorus and nitrogen and was flame resistant.

EXAMPLE 4

A cotton cloth was wet-out in an aqueous solution containing 10% tris(1-aziridinyl)phosphine sulfide, 10% tetrakis(hydroxymethyl)phosphonium chloride, 2% triethanolamine and 4% methylolmelamine. The cloth was dried and then heated 3 minutes at 160° C. After heating, it was washed in hot water and dried. The cloth was strong, it had a good hand, contained sulfur, phosphorus and nitrogen. The cloth was highly flame resistant.

EXAMPLE 5

An aqueous solution with a pH of 6.0–6.5 was prepared containing 12.5% tris(1-aziridinyl)phosphine oxide, 12.5% tetrakis(hydroxymethyl)phosphonium chloride, 4.0% triethanolamine and 1.5% cationic softener. The solution was applied to 8.2 oz. cotton twill in a padder to a wet pick-up of 56–58%. The fabric was dried for 3 minutes at 85° C. and then portions of it were heated for 5 minutes at various temperatures. After curing, the samples were washed and dried. Test results before and after a three hour soap-sodium carbonate boil are shown in Table I below. The treated fabric was not only flame resistant but also glow resistant.

Table I

| Curing Temp., °C. | Resin Add-on, Percent | Tear Strength Elmendorf (warp) Strength retained,[1] Percent | Breaking Strength Strip (warp) Strength retained,[1] Percent | Char Length (inches) | |
|---|---|---|---|---|---|
| | | | | Before soap boil | After soap boil |
| 110 | 6.7 | 180 | 89 | 4.4 | [2] BEL |
| 120 | 8.8 | 160 | 86 | 4.1 | BEL |
| 130 | 10.2 | 155 | 88 | 3.9 | 4.6 |
| 140 | 11.3 | 120 | 86 | 3.7 | 4.2 |
| 150 | 11.6 | 90 | 86 | 4.3 | 4.4 |

[1] Strength retained is based upon an untreated control fabric.
[2] BEL means that the strip burned entire length.

As shown in Table I the products showed excellent flame-resistance with as low as 6.7% resin add-on. Samples cured above 130° C. and containing over 10% resin showed excellent flame resistance and no afterglow after the strenuous three-hour soap boil previously described. The hand and appearance of the fabric was substantially unaltered by the resin treatment.

EXAMPLE 6

Another sample of 8 oz. cotton twill was treated as described in Example 5 except that the treating solution contained 4% triethanolamine plus 15% tris(1-aziridinyl) phosphine oxide $[(CH_2)_2N]_3P=O$, 15% tetrakis(hydroxymethyl) phosphonium chloride $(HOCH_2)_4PCl$. The wet pickup was 60% and the fabric was cured at 150° C. for five minutes after drying. The treated fabric contained 14% resin add-on, it had a char length of 3.6 inches, and had a tear strength 20% greater than an untreated control fabric as determined by the Elmendorf test method. It had an excellent hand and was highly flame and glow resistant.

EXAMPLE 7

8 oz. cotton twill was treated as described in Example 6 except that the treating solution contained 4% triethanolamine, 20% tris(1-aziridinyl)phosphine oxide and 20% tetrakis(hydroxymethyl)phosphonium chloride. The treated fabric contained 22.6% resin after drying, curing and washing and had a char length of 2.8 inches.

EXAMPLE 8

A treating solution was prepared containing the same amounts of reagents as in Example 7 above and in addition it contained 0.4% of a wetting agent. Five different fabrics—viscose rayon, fortisan, a cotton-fortisan blend, a cotton-nylon blend and a cotton-viscose rayon blend—were padded in the solution, dried at about 75° C. then cured at 140° C. for about 5 minutes. After washing and again drying, the fabrics were all highly flame resistant and contained phosphorous and nitrogen.

EXAMPLE 9

8.2 oz. cotton fabric was padded through an aqueous solution (pH of 5.9) containing 16% tris(1-aziridinyl) phosphine sulfide $[(CH_2)_2N]_3P=S$, 16% tetrakis(hydroxymethyl)phosphonium chloride, 4% triethanolamine, and 1.0% Triton X-100 (a wetting agent). The fabric was given two dips and two nips through the solution and the squeeze rolls of the padder were set to give a tight squeeze. The fabric was dried for 4 minutes at 80 to 90° C. and then cured 5 minutes at 140° C., and finally washed and dried. It contained 15.5% resin add-on and 1.55% nitrogen, 1.45% phosphorus and 1.23% sulfur. The fabric was strong and had a good hand. Some of the treated fabric was boiled in a soap-sodium carbonate solution for three hours and some of it was extracted for three hours with tetrachloroethylene. After the alkaline boil, the fabric contained 1.37% nitrogen, 1.24% phopshorus and 0.94% sulfur, while after the organic solvent extraction, it contained 1.54% nitrogen, 1.50% phosphorus and 1.23% sulfur.

EXAMPLE 10

A sample of 8 oz. cotton sateen fabric was padded in an aqueous solution containing 16.5% tris(1-aziridinyl) phosphine sulfide, 16.5% tetrakis(hydroxymethyl)phosphonium chloride, 4% triethanolamine and 1% of a wetting agent and then dried for 4 minutes at 80° to 90° C. The dry fabric was then cut into four pieces and then each piece was cured for five minutes at the temperature shown in Table II. The resin add-on obtained and certain physical data are also shown in Table II. After the fabrics were cured, washed and dried, a portion of each of the four samples was softened with Triton X-400 by padding it through an aqueous suspension of the softener and then drying.

*Table II*

| Sample No | Cure Temperature, ° C. | Resin Add-on, Percent | Char Length, inches | Trapezoid Tear, lbs. | Elmendorf Tear [1] | |
|---|---|---|---|---|---|---|
| | | | | | Before softening, lbs. | After softening, lbs. |
| 1 | 110 | 6.7 | 5.0 | 9.8 | 11.4 | 13.0 |
| 2 | 120 | 10.5 | 4.3 | 9.9 | 9.5 | 10.2 |
| 3 | 130 | 11.1 | 3.9 | 9.0 | 9.0 | 11.6 |
| 4 | 140 | 11.9 | 4.5 | 7.5 | 7.3 | 8.0 |

[1] Elmendorf tear strength of untreated control fabric was 11.9 lbs.

EXAMPLE 11

Two fabric treating solutions were prepared as follows: (A) An aqueous solution was made by dissolving 10 parts of tris(1-aziridinyl)phosphine sulfide, 10 parts of tris(hydroxymethyl)phosphine oxide in 80 parts of water and then adjusting the pH of the solution to 7-8 by use of sodium carbonate solution (this solution designated solution "A"); (B) An aqueous solution was made by dissolving 15 parts of tris(1-aziridinyl)phosphine sulfide, 15 parts of tris(hydroxymethyl)phosphine oxide in 70 parts of water and then adjusting the pH to 6.4 by use of sodium carbonate solution (this solution designated solution "B").

A sample of sateen fabric that was padded in solution "A," dried at 70° C., cured at 150° C. and washed contained 6% resin. Another sample of sateen that was passed through solution "B," dried at 70° C., cured at 150° C. and washed contained 6.3% resin. Both fabrics were flame resistant, were strong and had a good hand.

EXAMPLE 12

This example illustrates the influence of varying the mole ratio of reactants. Seven solutions were made in which the mole ratio of tris(1-aziridinyl)phosphine sulfide to tetrakis(hydroxymethyl)phosphonium chloride was varied from 1:1 to 1:4 and from 4:1 to 1:1 as shown in Table III where tris(1-aziridinyl)phosphine sulfide is represented by the term APS and tetrakis(hydroxymethyl) phosphonium chloride is represented by the term THPC. Each solution contained a total concentration of reagents (APS plus THPC) equal to 20% of the total solution weight. A fabric sample was padded in each of the solutions, dried, cured 5 minutes at 150° C. and then washed and dried. The resin add-on obtained and the Elmendorf tear strength (after softening with a cationic textile softener Triton X-400) are shown in Table III.

*Table III*

| Solution No. | Moles of Reagent in Solution | | Resin Add-on, Percent | Elmendorf Tear (warp), lbs. | Char Length (inches) [1] |
|---|---|---|---|---|---|
| | APS | THPC | | | |
| 1 | 1 | 1 | 6.7 | 10.1 | 5.3 |
| 2 | 1 | 2 | 4.4 | 8.5 | BEL |
| 3 | 1 | 3 | 2.9 | 7.3 | BEL |
| 4 | 1 | 4 | 2.3 | 6.3 | BEL |
| 5 | 2 | 1 | 7.2 | 10.3 | BEL [2] (4.9) |
| 6 | 3 | 1 | 6.2 | 10.2 | BEL |
| 7 | 4 | 1 | 6.6 | 9.8 | BEL [2] (6.5) |

[1] BEL means sample burned entire length.
[2] One of the two samples tested passed the flame test.

The solutions used above were allowed to stand at about 27° C. for 24 hours then again used to treat similar fabric samples. The results obtained with these fabrics were very similar to those described above. This experiment shows that the aqueous solutions are suitable for use even after standing for 24 hours.

EXAMPLE 13

An aqueous solution was prepared containing 17% tris(1-aziridinyl)phosphine sulfide and 17% tetrakis(hydroxymethyl)phosphonium chloride. This solution was used to treat several fabrics by padding, drying, curing and then washing and drying. The fibers used in the fabrics, the resin add-on, and the degree of flame resistance are shown in Table IV. The flame resistance was measured by determining the angle at which a strip of the fabric (5 inches long and ½ inch wide) would not continue to burn when held in the vertical position and ignited at the bottom and then slowly rotated until the flame went out.

*Table IV*

| Fabric Treated (Fibers used in Fabric) | Resin Add-on, Percent | Flame Resistance Strip Test (angle where strip would not support flame), degrees |
|---|---|---|
| Cotton | 15 | 180 |
| Nylon | 20 | 0 |
| Cotton—nylon | 17 | 135 |
| Orlon | 25 | 0 |
| Acetate rayon | 10 | 0 |
| Viscose rayon | 12 | 170 |
| Cotton—viscose rayon | 18 | 180 |
| Fortisan | 10 | 135 |
| Cotton—fortisan | 17 | 170 |

EXAMPLE 14

A solution was prepared exactly as described in Example 13 except that only 15% of each reagent was used. A sample of wool blanket and a strip of blotter paper were padded in the solution, dried, cured at 150° C. then washed and dried. Both the wool and paper were extremely flame resistant.

In the foregoing examples the equal parts by weight of aziridinyl compound and methylol-phosphorus compound correspond, in molar terminology, to about 1½ moles of aziridinyl compound per mole of methylol-phosphorus compound.

We claim:
1. A process for rendering a hydrophilic fibrous organic fabric flame resistant which comprises impregnating such fabric with a composition which comprises an aqueous solution containing (1) an aziridinyl compound selected from the group consisting of tris (1-aziridinyl) phosphine oxide and tris (1-aziridinyl) phosphine sulfide and (2) a methylol phosphorus compound selected from the group consisting of tris (hydroxymethyl) phosphine oxide, tetrakis (hydroxymethyl) phosphonium chloride, and a reaction product of said methylol phosphorus compound with a compound containing at least one trivalent nitrogen atom and at least one member of the group consisting of H— and —CH₂OH attached to a trivalent nitrogen atom, said solution containing about from 1 to 1½ moles of aziridinyl compound per mole of phosphorus compound, drying the impregnated fabric, and then heating it at a temperature of about from 100° to 160° C. for a period of about from 2 to 10 minutes, using the longer time with the lower temperature to cause said aziridinyl compound and said phosphorus compound to react with each other to form a flame-retardant polymeric reaction product in said fabric.

2. The process of claim 1 in which the aqueous solution comprises a solution of tris (1-aziridinyl) phosphine oxide and tetrakis (hydroxymethyl) phosphonium chloride.

3. The process of claim 1 in which the aqueous solution comprises a solution of tris (1-aziridinyl) phosphine sulfide and tetrakis (hydroxymethyl) phosphonium chloride.

4. The process of claim 1 in which the aqueous solution comprises a solution of tris (1-aziridinyl) phosphine sulfide, tetrakis (hydroxymethyl) phosphonium chloride, triethanolamine, and methylolmelamine.

5. The process of claim 1 in which the aqueous solution comprises a solution of tris (1-aziridinyl) phosphine oxide, tetrakis (hydoxymethyl) phosphonium chloride, triethanolamine, and urea.

6. The process of claim 1 in which the aqueous solution comprises a solution of tris (1-aziridinyl) phosphine sulfide and tris (hydroxymethyl) phosphine oxide.

7. A process for rendering a hydrophilic fibrous organic fabric flame resistant which comprises impregnating said fabric with a homogeneous liquid composition containing the partially polymerized reaction product obtained by gently heating an aqueous solution containing (1) an aziridinyl compound selected from the group consisting of tris (1-aziridinyl) phosphine oxide and tris (1-aziridinyl) phosphine sulfide and (2) a methylol phosphorus compound selected from the group consisting of tris (hydroxymethyl) phosphine oxide, tetrakis (hydroxymethyl) phosphonium chloride, and a reaction product of said methylol phosphorus compound with a compound containing at least one trivalent nitrogen atom and at least one member of the group consisting of H— and —CH₂OH attached to a trivalent nitrogen atom, said solution containing about from 1 to 1½ moles of aziridinyl compound per mole of phosphorus compound, and then thermally completing the polymerization of the partial polymer in the fabric to produce in said fabric a flame-retardant polymeric reaction product between said aziridinyl compound and said phosphorus compound.

8. A flame resistant, glow resistant, mildew and rot resistant, shrink resistant hydrophilic fibrous organic fabric comprising such a fabric impregnated with a polymeric reaction product of an aziridinyl compound with a methylol-phosphorus compound produced by heating a mixture comprising (1) an aziridinyl compound selected from the group consisting of tris (1-aziridinyl) phosphine oxide and tris (1-aziridinyl) prosphine sulfide and (2) a methylol phosphorus compound selected from the group consisting of tris (hydroxymethyl) phosphine oxide, tetrakis (hydroxymethyl) phosphonium chloride, and a reaction product of said methylol phosphorus compound with a compound containing at least one trivalent nitrogen atom and at least one member of the group consisting of H— and —CH₂OH attached to a trivalent nitrogen atom, said mixture containing about from 1 to 1½ moles of aziridinyl compound per mole of phosphorus compound.

References Cited in the file of this patent

UNITED STATES PATENTS

| | | |
|---|---|---|
| 2,606,901 | Parker et al. | Aug. 12, 1952 |
| 2,654,738 | Lecher et al. | Oct. 6, 1953 |
| 2,672,459 | Kuh et al. | Mar. 16, 1954 |
| 2,781,281 | Berger | Feb. 12, 1957 |
| 2,810,701 | Reeves et al. | Oct. 22, 1957 |